United States Patent
Kinney, Jr. et al.

[11] Patent Number: 6,070,860
[45] Date of Patent: Jun. 6, 2000

[54] CROSSFLOW WATER COOLING TOWER HAVING STRUCTURE ALLOWING AIR FLOW THROUGH WATER DISTRIBUTION SYSTEM

[75] Inventors: Ohler L. Kinney, Jr., Overland Park, Kans.; John D. Dalton, Platte Woods, Mo.; Eldon F. Mockry, Lenexa, Kans.

[73] Assignee: The Marley Cooling Tower Company, Overland Park, Kans.

[21] Appl. No.: 09/133,941

[22] Filed: Aug. 14, 1998

[51] Int. Cl.[7] .................................................. B01F 3/04
[52] U.S. Cl. ........................ 261/30; 261/109; 261/112.2; 261/DIG. 11
[58] Field of Search ............................ 261/30, 36.1, 84, 261/109, 110, 111, 112.2, DIG. 11

[56] References Cited

U.S. PATENT DOCUMENTS

| | | | |
|---|---|---|---|
| 3,363,885 | 1/1968 | Meek | 261/30 |
| 3,707,277 | 12/1972 | Phelps . | |
| 3,791,634 | 2/1974 | Phelps | 261/DIG. 11 |
| 4,337,216 | 6/1982 | Korsell | 261/DIG. 11 |
| 4,530,804 | 7/1985 | Cates et al. | 261/DIG. 11 |
| 5,028,356 | 7/1991 | Wiltz | 261/DIG. 11 |
| 5,427,718 | 6/1995 | Phelps . | |
| 5,569,415 | 10/1996 | Phelps . | |

*Primary Examiner*—C. Scott Bushey
*Attorney, Agent, or Firm*—Hovey, Williams, Timmons & Collins

[57] ABSTRACT

A high thermal capacity crossflow water cooling tower (30) is provided having upright fill structure (32) with a plurality of water distributors (34) oriented to deliver initially hot water to upper portions of the fill structure (32) for gravitation therethrough, with a cooling air current generator for producing cooling air currents which enter the fill structure inlet face (44) and exit the fill both laterally through the fill outlet face (46) and upwardly through the horizontal fill upper face (48). In practice, at least about 50% (more preferably at least about 70%) of the total airflow through the fill structure (32) exits the fill through the outlet face (46). Low cooling potential air traversing the fill structure (32) is thus vented upwardly so that greater volumes of more effective cooling air may be drawn through the fill structure (32). Where a fan assembly (38) is employed, the diameter of the fan (80) is advantageously greater than the maximum transverse dimension of the underlying plenum (64), so that the fan (80) partially overlies the water distributors (34). Therefore, greater volumes of air can be drawn through the tower (30), as compared with conventional crossflow towers. The cooling towers of the invention have been shown to exhibit up to about a 33% increase in thermal capacity over prior crossflow designs.

46 Claims, 9 Drawing Sheets

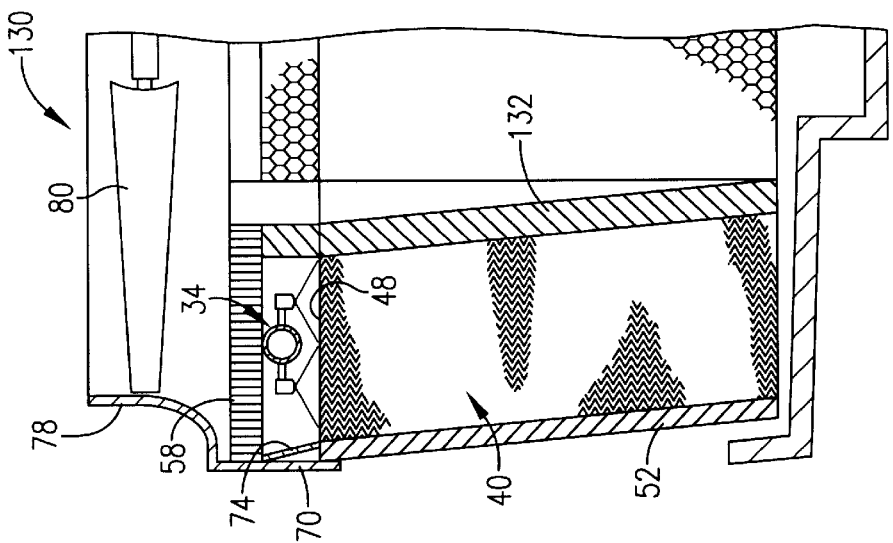
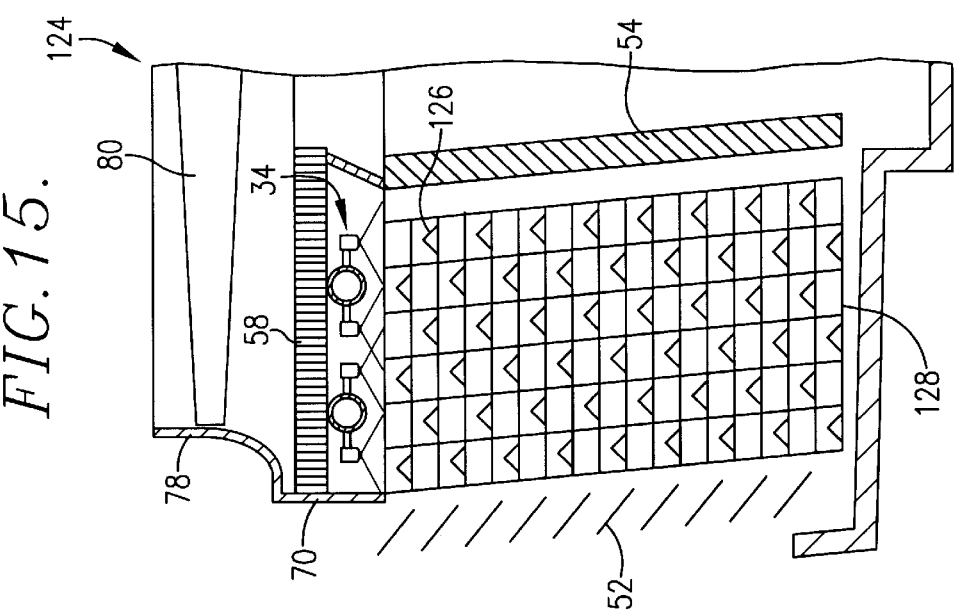
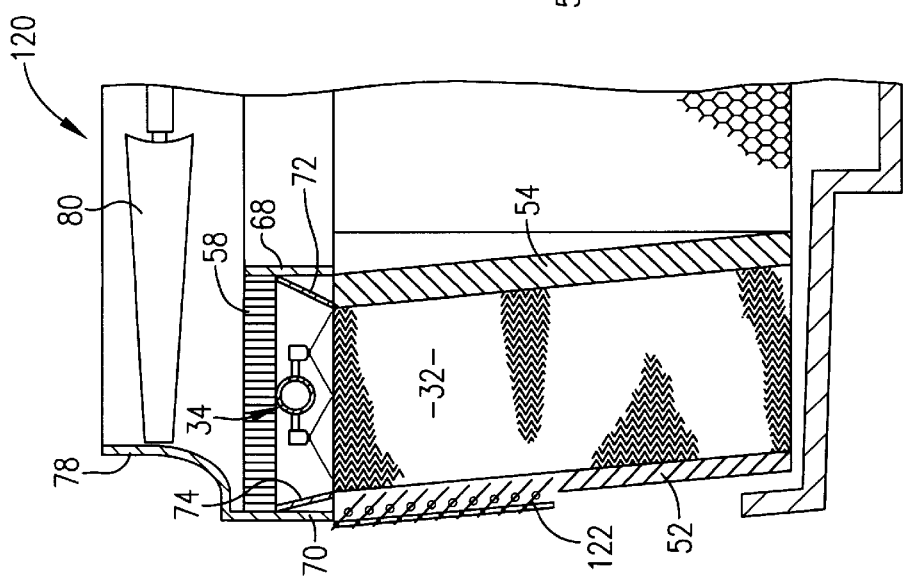

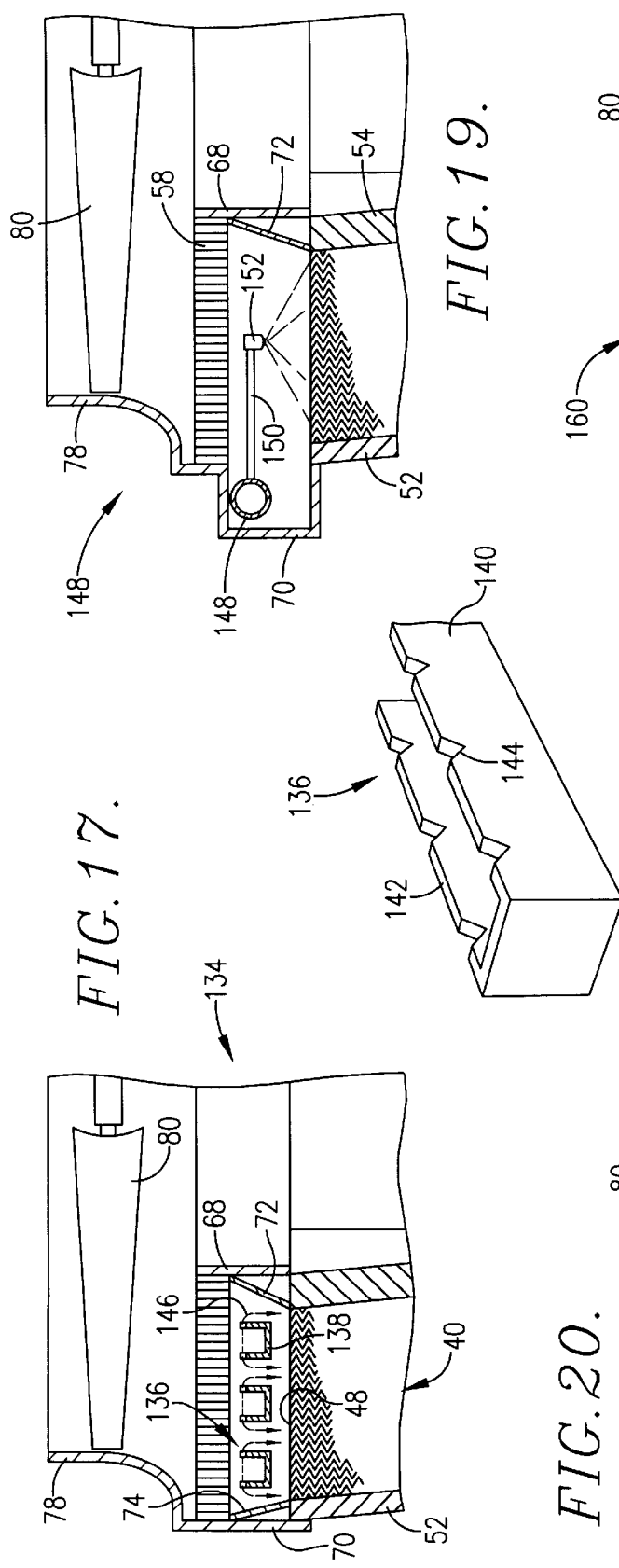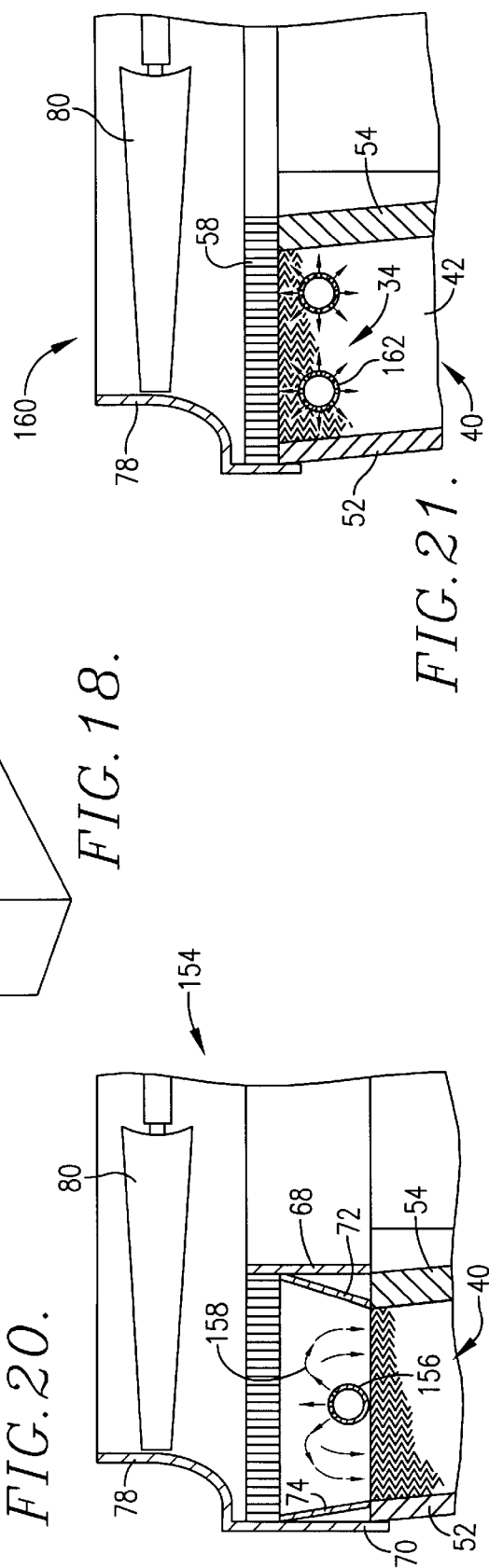

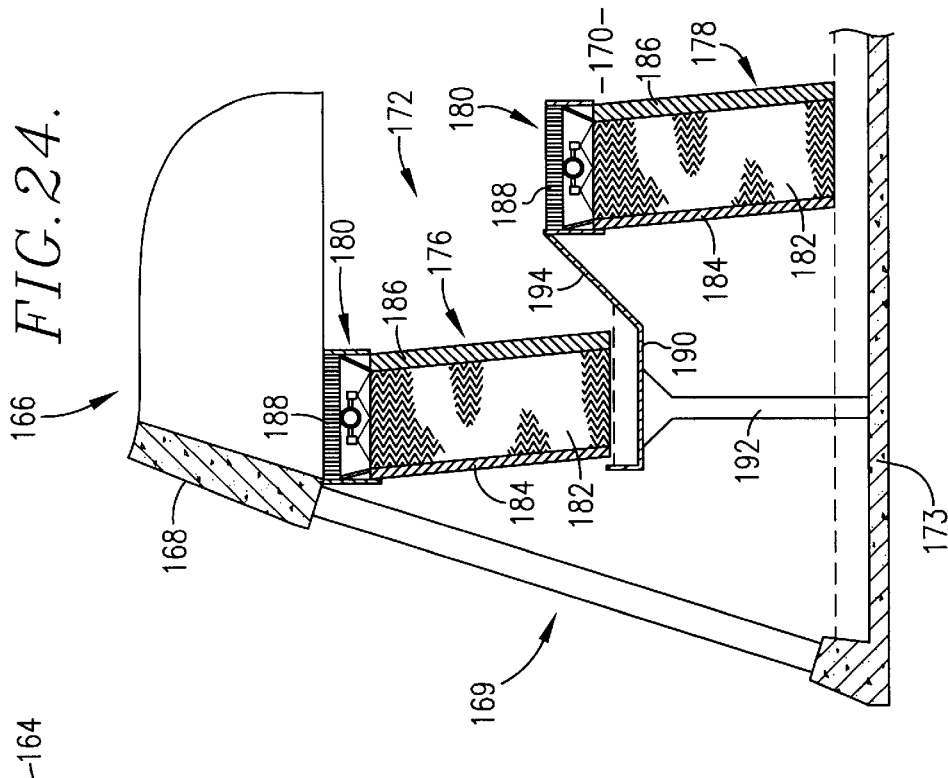
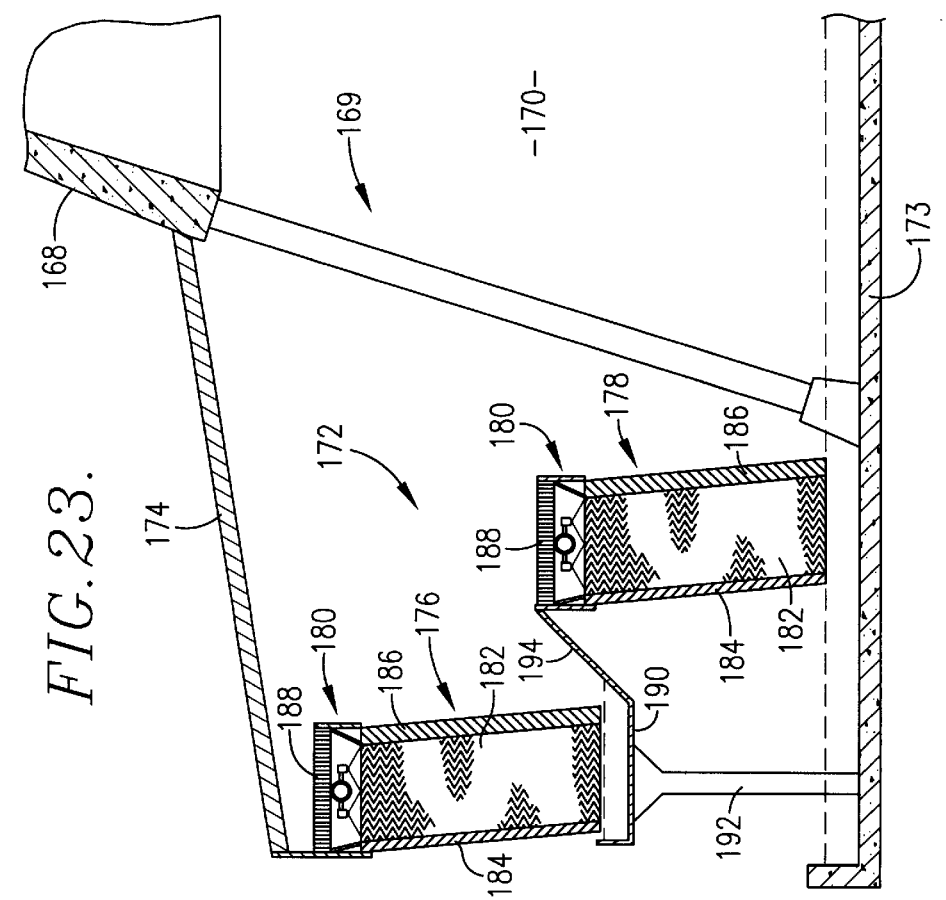

CROSSFLOW WATER COOLING TOWER HAVING STRUCTURE ALLOWING AIR FLOW THROUGH WATER DISTRIBUTION SYSTEM

BACKGROUND OF THE INVENTION

1. Field of the Invention

The present invention is broadly concerned with improved crossflow water cooling towers and methods of use thereof wherein the towers are constructed so that entering crossflow cooling air currents exit the crossflow fill structure of the tower both laterally through the upright outlet face of the fill and upwardly through the generally horizontal upper face thereof, i.e., at least about 50% of the total air flow through the fill structure exits through the upright air outlet face while the remainder exits through the upper face; the hot water distributors for the towers are arranged adjacent the upper portion of the fill structure and are located so as to permit passage of air currents therebetween. In this way, low cooling potential air passing through the upper portion of the fill is immediately vented from the fill, so that greater volumes of more effective cooling air currents may be drawn transversely through the fill. The towers of the invention may be of the mechanical draft variety wherein a large multiple-blade fan assembly is employed in partial overlying relationship to the upper face of the fill, of the natural draft type employing a large hyperbolic stack, or of the forced mechanical draft type.

2. Description of the Prior Art

Industrial sized water cooling towers have found extensive use in large industrial, business and multiple resident complexes because of their ability to efficiently dissipate large amounts of process or occupancy generated heat to the atmosphere. Cooling towers of this type are found in various areas including factory complexes, chemical processing plants such as petrochemical facilities, near offices, at hospitals, as a part of multi-family apartments or condominiums, as a part of large commercial retail properties, warehouses and electrical generating stations including nuclear power plants.

Conventional mechanical draft crossflow cooling towers are constructed with upright unitary or sectionalized fill structure (either of the splash bar or sheet film type) surmounted by hot water distribution basins equipped with target nozzles which distribute the incoming hot water over the fill. The interior space bounded by the fill structure and the cold water basins defines a plenum for the tower. A fan assembly made up of an apertured deck, a powered fan and a surrounding venturi-shaped stack is positioned above and in communication with the plenum. In the operation of crossflow cooling towers, hot water is introduced at the top of the fill while the coldest (ambient) air is introduced along the upright sides of the tower. The highest potential for cooling exists at the top of the air inlet sides where the hottest water comes into contact with the coldest air. Once such air has been heated such that the wet bulb temperature of the air is near the water temperature, the air has no more capacity to cool the water, and such heat saturated air prevents the introduction of cooler ambient air into the fill. Air near the top of the tower typically experiences this condition because it initially contacts the hottest water, and all other water along its path of travel is about the same temperature. Air entering near the bottom of the tower initially is exposed to water that has been significantly cooled. As it traverses through the fill, the temperature of the water encountered by the bottom air currents rises, which allows the air to take on more heat.

The hot water basins in a crossflow tower are normally constructed to serve as an air seal to prevent air entering the tower through the top of the fill. Additionally, air seals along the length of the tower are provided along the inboard and outboard edges of the basins to seal from the bottom of the basins to the top of the fill. These seals prevent air from entering the spray chamber and bypassing or "short circuiting" the fill structure. Sealing of the distribution basins also minimizes the contact between incoming air currents and relatively large water particles adjacent the spray nozzles.

The plenum size in a crossflow tower generally dictates the maximum fan diameter, i.e., increasing the fan diameter necessarily requires an increase in the plenum size. Air discharge from the top of conventional crossflow fill structure enters the plenum in a generally horizontal direction, although drift eliminators may be so directed as to discharge the air in an upwardly sloping direction. In any case, the air must turn to approach the fan, which creates interference with the air flow from below which is attempting to reach the fan in a generally vertical direction. Some crossflow designs extend the plenum chamber a few feet above the hot water basin level to provide better entry of the air from the top of the fill structure into the fan. Theoretically, if this vertical extension of the plenum is of sufficient height, the sidewalls of the plenum could slope outwardly to provide for placement of a larger fan assembly. Any such expansion of the plenum would necessarily need to be gradual (about 5° from the vertical) so as to manage the expansion of the air through the plenum extension without disruption. However, the gain in performance (if any) in such a tower would not be great, owing to the fact that a very great plenum extension would be required to add appreciable diameter to the fan.

An increase in the amount of air passing through the fill structure of a crossflow tower generally increases the amount of cooling. However, as the air rate increases, the pressure drop across the tower increases exponentially. Cooling towers typically operate in the range of from about 20–50 pda/sf/min (pounds of dry air/square foot/minute). Lower air rates do not produce as much cooling for a given tower as compared with higher air rates. Also, lower air rates typically result in low stack discharge velocities which may promote recirculation of effluent warm air back through the tower air inlets, reducing the efficiency of the tower. Lower air rate towers are also subject to wind disturbances which can lessen performance. On some tower designs, the pressure drop may be too large to achieve 50 pda/sf/min. air rate even with the largest fan assembly which can fit the design. Alternately, the air inlet face area may be so large that the fan-induced air flow is insufficient to reach high air rates regardless of pressure drop. For example, four-way induced draft crossflow cooling towers described in U.S. Pat. No. 4,788,013 may be subject to this problem.

It is also been proposed in the past to construct hybrid cross-counterflow cooling towers wherein crossflow fill splash bars are located in the descending water/air entrance zone of the tower. For example, UK patent no. 528,938 describes a multiple fill stack arrangement in a counterflow natural draft cooling tower. In this design, splash fill is placed at the level of the air inlet for crossflow cooling, and also above the air inlet for counterflow cooling. However, the large pressure drop incident to the fill arrangement would limit the volume of air currents exiting the upright inboard surface of the fill to no more than about 10% of the incoming air to the fill. Thus, a very high proportion of the air exiting the fill would pass through the upper horizontal surface thereof.

Other instances of combined crossflow/counterflow towers are illustrated in U.S. Pat. Nos. 3,707,277; 5,427,718;

and 5,569,415. The latter patent provides an increased plenum area without increasing the width of the tower by truncating the upper inboard corners of the fill. The main problem with this idea is the complicated water distribution system required, and the difficulty in developing a reasonable air flow distribution through such a non-uniform fill bank arrangement.

Prior crossflow cooling tower designs have been limited by the perceived need to prevent "short circuiting" or upward exiting flow of air from the upper portion of the fill, i.e., to insure that essentially all of the incoming air currents pass transversely through the fill structure and exit the outlet face thereof into the plenum. This design consideration in turn significantly limits the fan size to the approximate diameter of the plenum, and thus reduces the amount of air which can be effectively drawn through the tower. All of these factors therefore contribute to less than desirable tower cooling efficiency. Moreover, hybrid crossflow/counterflow tower designs have not been successful, principally due to the fact that the different types of fill structure employed therein do not operate efficiently at the same levels of water loading; therefore, at water loadings suitable for crossflow fill, the counterflow fill sections do not perform properly, and vice versa.

SUMMARY OF THE INVENTION

The present invention overcomes the problems outlined above and provides crossflow cooling towers having increased inlet air flow rates above 50 pda/sf/min. while lowering pressure drops across the towers and exit velocities of the air from the fill structure. Comparative testing has revealed that this tower of the invention can exhibit increased cooling efficiencies of up to 33%, as compared with conventional crossflow towers. These results are obtained by constructing towers which evacuate air with little cooling potential near the top of the fill upwardly through the horizontal fill upper surface, thereby allowing introduction of additional volumes of air into the fill having greater cooling potential.

Broadly speaking, water cooling towers in accordance with the invention include upright fill structure having a plurality of spaced apart hot water distributors oriented to deliver hot water to upper portions of the fill for gravitational flow therethrough. A cooling air current generator is also provided for producing ambient-derived air cooling currents which enter the fill structure inlet face and exit the fill both laterally through the normal fill outlet face and upwardly through the upper surface of the fill, with at least about 50% of the total air flow through the fill structure exiting the fill through the normal upright air outlet face, whereas the remainder of the air passes upwardly between the hot water distributors. Normally, the fill structure is designed so that the total plan surface area thereof is less than about 50% (more preferably less than about 35%) than the total surface area of the upright air outlet face of the fill.

The cooling air current generator is preferably in the form of a fan unit made up of a shroud, a fan assembly having multiple blades secured to a hub, and a motive power unit in the nature of a direct-drive motor or a motor-driven gearbox. Alternately, hyperbolic natural draft-inducing structure may be employed to induce flow of cooling air currents through the fill assembly of the tower. In the case of mechanical draft towers, the fan(s) are advantageously of a diameter to extend outwardly beyond the plenum in overlying relationship to the hot water distributors. Thus, very large fans can be employed in order to maximize tower efficiency without increasing tower height. In practice, the fan employed has a diameter greater than the maximum transverse dimension of the plenum (usually at the upper margin of the plenum), preferably at least about 10% greater, and more preferably extending as far as practical toward the air inlet faces without overhanging the fill.

In preferred forms, the towers of the invention are equipped with drift eliminators adjacent the upright air outlet face of the fill structure, and also above the hot water distributors. These eliminators can be of any conventional design, such as the well known "honeycomb" eliminators. While film-type fill structure made up of a plurality of upright, laterally spaced apart, synthetic resin film sheets are normally used in the towers of the invention, conventional splash-type fill bars can also be utilized.

A number of different hot water distributors can be employed, for example, spaced apart water spray nozzles, apertured distribution pipes or weir-type distribution pans which are located above the upper surface of the fill structure. Alternately, where sheet-type film fills are used, apertured distribution pipes can be employed which extend through the upper portion of the fill structure in order to support the fill.

The towers of the invention can also be provided with a number of other alternate features. To give but one example, outboard louvers can be provided at the top of the fill to direct air downwardly into the fill. Such louvers may be of stationary design or more preferably shiftable for adjustment purposes.

BRIEF DESCRIPTION OF THE DRAWINGS

FIG. 14 is fragmentary vertical sectional view of a crossflow cooling tower in accordance with the invention equipped with an adjustable inlet louver assembly;

FIG. 15 is a fragmentary vertical sectional view of a crossflow cooling tower in accordance with the invention making use of splash-type fill bars;

FIG. 16 is a fragmentary vertical sectional view of a crossflow cooling tower in accordance with the invention making use of inboard drift eliminator structure extending the full height of the fill structure and water distribution system, and butting the underside of the horizontal drift eliminator;

FIG. 17 is a fragmentary vertical sectional view of a crossflow cooling tower in accordance with the invention making use of a plurality of weir-type water distribution pans located above the film-type fill structure;

FIG. 18 is a fragmentary perspective view of one of the weir-type distribution pans illustrated in FIG. 17;

FIG. 19 is a fragmentary vertical sectional view of a crossflow cooling tower in accordance with the invention, wherein the water distribution system includes an outboard manifold and a plurality of inwardly extending nozzle assemblies;

FIG. 20 is a fragmentary vertical sectional view of a crossflow cooling tower in accordance with the invention, wherein the water distribution system comprises a centrally disposed manifold having a plurality of apertures in the upper surface thereof for application of water to the underlying fill structure;

FIG. 21 is a fragmentary vertical sectional view of a crossflow cooling tower in accordance with the invention, wherein the water distribution system comprises a plurality of apertured distribution pipes, the pipes supporting the film-type fill structure;

FIG. 23 is a fragmentary, essentially schematic vertical sectional view illustrating a hyperbolic natural draft water cooling tower in accordance with the invention, using offset annular fill structures located in a cooling section located outboard of the hyperbolic tower;

FIG. 24 is a fragmentary, essentially schematic vertical sectional view illustrating another hyperbolic natural draft water cooling tower in accordance with the invention, using offset annular fill structures located within the confines of the hyperbolic tower.

DETAILED DESCRIPTION OF THE PREFERRED EMBODIMENT

Figure 1:
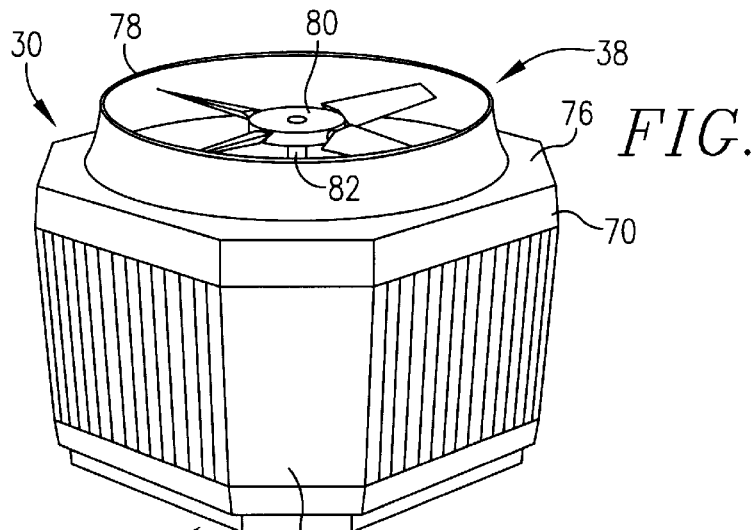
FIG. 1 is a perspective view of a single cell, mechanical draft crossflow water cooling tower in accordance with the invention.
Figure 2:
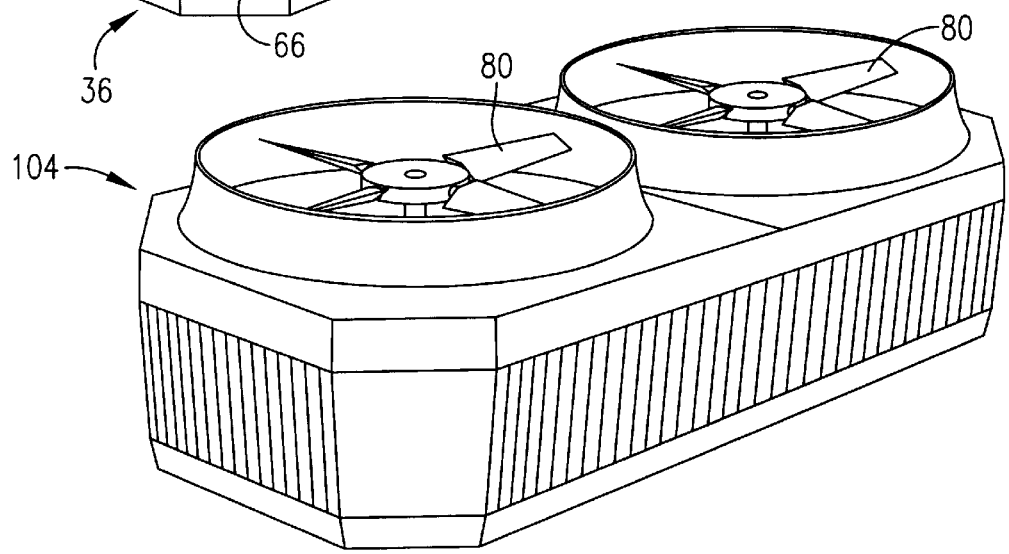
FIG. 2 is a perspective view similar to that of FIG. 1, but depicting a double cell mechanical draft crossflow water cooling tower in accordance with the invention.
Figure 5:
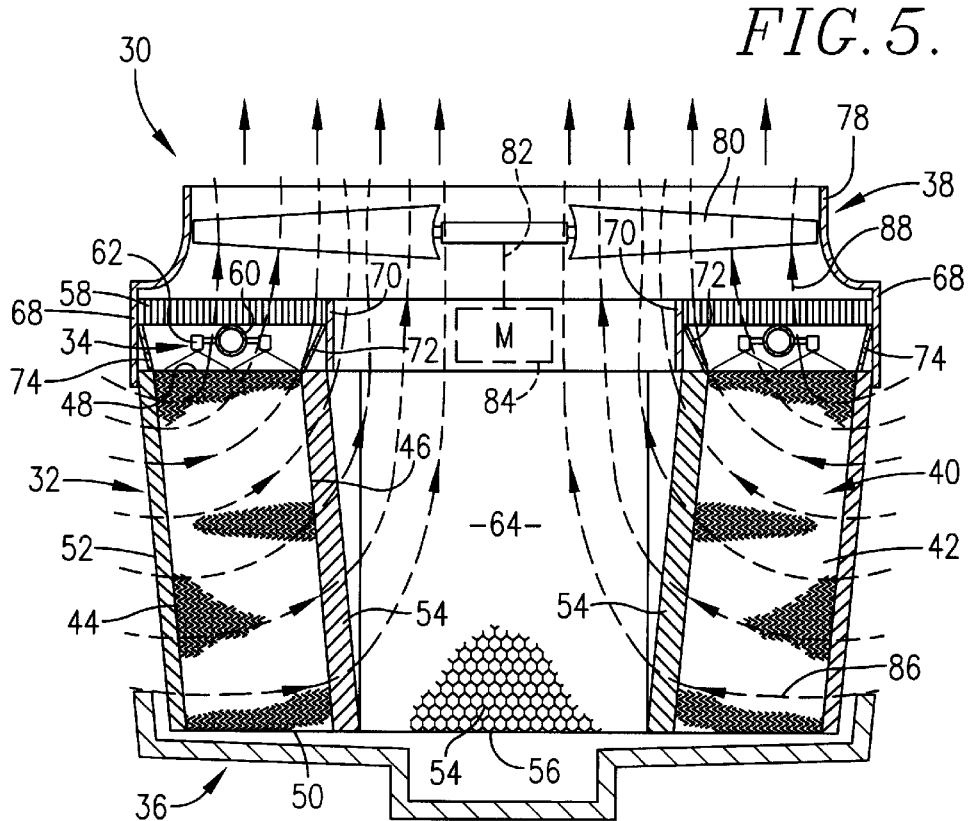
FIG. 5 is an essentially schematic vertical sectional view of a single cell mechanical draft crossflow water cooling tower of the invention, depicting the airflow through the tower.

Turning now to the drawings, and particularly FIGS. 1 and 5, a water cooling tower 30 in accordance with the invention is illustrated. Broadly speaking, the tower 30 is made up of an upright fill structure referred to by the numeral 32, a series of spaced apart hot water distributors 34 above the fill structure 32, a cold water collection basin 36 below the fill structure, and a cooling air current generator comprising a fan unit 38. In more detail, the fill structure in the tower 30 comprising one embodiment of the invention is made up of a total of four film-type fill packs or units 40 which are aligned in a quadrate fashion in two opposed pairs so as to present a "quad-flow" tower. Each of the units 40 is made up of a plurality of upright, spaced apart film fill sheets 42 of chevron or herringbone design. Fill sheets of this general type are described in U.S. Pat. Nos. 4,801,410; 4,548,766; and 4,320,073, incorporated by reference herein. Each of the units 40, and thus the overall fill structure 32, present upright air inlet faces 44, opposed, upright air outlet faces 46, generally horizontal upper face 48 extending between the faces 44, 46 and a lower face 50.

The air inlet faces 44 are typically provided with obliquely oriented louvers 52 which in the embodiment shown are stationary. These louvers serve to direct incoming air currents downwardly into the fill structure 32 for maximum cooling effect. On the other hand, the air outlet faces 46 have adjacent upright honeycomb-type drift eliminators 54 which serve to remove entrained droplets of water from the air exiting fill structure 32. Such drift eliminators are well known, and are made up of a series of elongated, obliquely oriented hexagonal in cross-section cells 56 (see FIG. 5). Secondary vertically oriented drift eliminators 58 are also provided above the distributors 34 as illustrated and described in U.S. Pat. No. 4,333,749, incorporated by reference herein. The distributors 34 include one or more hot water delivery pipes 60 which are situated between the eliminators 58 and fill structure 32. A series of nozzle pipes 62 are secured to the pipes 60 and serve to spray water onto the upper surface 48 of the fill structure units 40. Collection basin 36 is entirely conventional and is normally in the form of a preformed basin positioned below the fill structure 32 as shown.

The fill units 40 are arranged with their respective eliminators 54 to cooperatively define a central plenum 64. To this end, the fill units 40 and the associated structure of tower 30 are supported by uprights 66 and have interconnected outboard sidewall panels 68 and upright inboard panels 70. As illustrated in FIG. 5, a pair of obliquely extending barrier walls 72, 74 are provided with each pack 40; the walls 72 extend upwardly from the inboard upper margin thereof to the underside of the associated secondary drift eliminator 58, whereas the exterior wall 74 extends upwardly from the outboard upper margins of the pack to the underside of the drift eliminator 58.

The fan unit 38 is made up of an apertured horizontal deck 76 which supports an upright, venturi-shaped stack 78. In addition, the unit 38 includes a rotatable, multiple blade fan assembly 80 which includes a plurality of blades secured by suitable hardware to a central hub. The assembly 80 is positioned within the stack 78 as shown in FIG. 5. The fan assembly 80 is supported on a vertical shaft 82, which is coupled to a motor 84. The fan 80 has a diameter which is substantially greater than the maximum transverse dimension of plenum 64 (i.e., the maximum horizontal dimension of the plenum at the upper edge of the fill structure 32). In practice, the fan blade diameter should be at least about 10% greater than the maximum transverse dimension of the plenum, and more preferably extending as far as practical toward the air inlet faces without overhanging the fill.

In operation, initially hot water is delivered via the pipes 60 to the individual nozzles 62, thereby causing such water to be sprayed onto the upper faces 48 of the fill units 40 for gravitation of hot water therethrough. At the same time, rotation of fan 80 through the medium of motor 84 causes ambient-derived air currents to be drawn through the fill structure 32 so as to come into evaporative cooling contact with the hot water descending through the fill structure. However, owing to the construction of tower 30, such entering air currents exit the fill structure both through the outlet faces 46 and the upper faces 48 of the fill units 40, this being depicted by arrows 86, 88. Of course, the spacing between the hot water distributors 34, the lack of any preventive sealing, and the presence of the barrier walls 72, 74, permits upward air flow through the faces 48. In practice, the tower 30 operates so that at least about 50% (more preferably at least about 70%) of the total air flow through the fill structure 32 exits the latter through the upright air outlet faces 46 of the fill units 40, with the remainder passing through the upper faces 48. As the air currents exit the fill structure 32, entrained water droplets in the air is removed by the eliminators 54 and 58 of each unit 40. Thereafter, the air currents pass upwardly through the stack 78.

Figure 3:
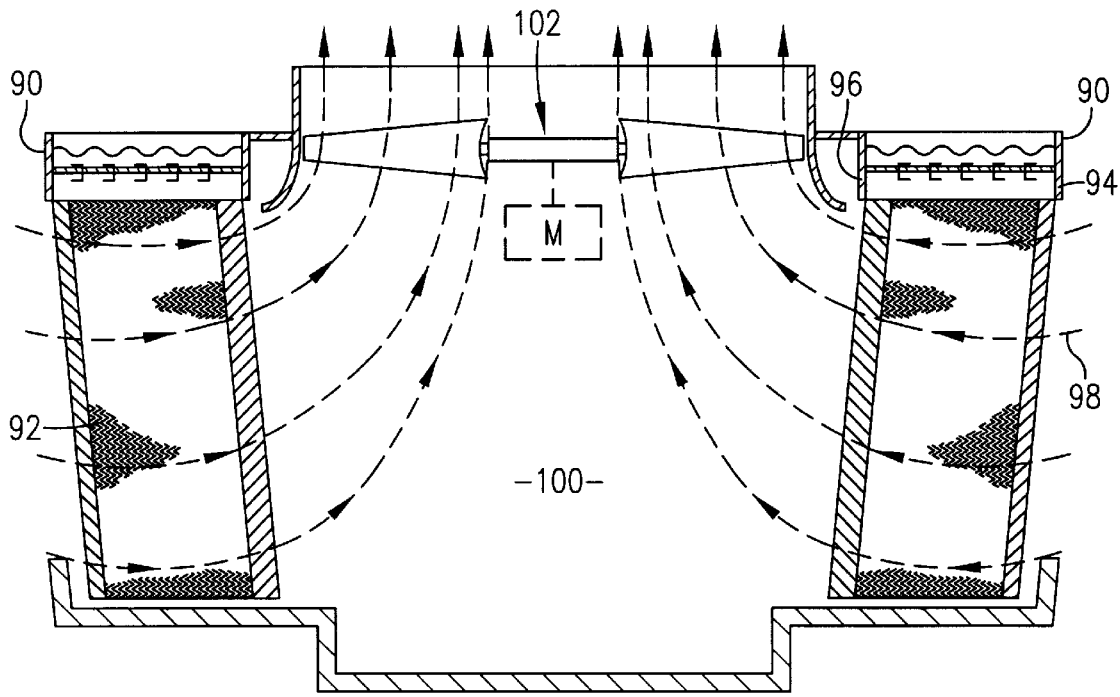
FIG. 3 is an essentially schematic vertical sectional view of a conventional prior art mechanical draft crossflow water cooling tower.

Conventional crossflow cooling towers are illustrated in FIG. 3. In such prior units, basin and nozzle-type hot water distribution pans 90 are located above fill structure 92, and sealing walls 94, 96 are provided for preventing upward short circuiting of air from the fill structure. As will be readily appreciated from a study of the FIG. 3 construction, all incoming air currents 98 entering the fill structure 92 pass laterally through the upright outlet face thereof and enter plenum 100, and the nature of the basin sealing arrangement prevents any substantial exiting air flow through the upper surface of the fill structure. As a result of this design, the fan 102 in the prior tower has a diameter which is no greater than the maximum transverse dimension of the plenum 100.

The tower 30 has a number of important advantages as compared with prior art crossflow towers. First, because the tower 30 is constructed so as to induce exiting air flow from the fill structure both through the upright faces 46 and upper faces 48 of the fill units 40, a considerably larger fan 80 can be employed which extends at least partially over the hot water distributors 34. This in turn allows an increase in inlet air rates well above 50 pda/sf/min. Furthermore, air which has little driving force (i.e., capacity to absorb more heat) is vented out of the top of the fill through the upper surfaces 48 before traveling transversely the full width of the fill. This allows other air with more driving force potential to travel across the fill, picking up heat ad cooling the water. Considering a constant fan power, the towers of the present invention exhibit increases of up to 33% and more in cooling capacity, as compared with the prior art. By venting air out of the top of the fill structure, more air may be supplied to the fill without reaching exit velocities which cause excessive drift. Furthermore, top venting reduces pressure drop to the fill so that more air can be supplied to the fill at constant power (or less power is required to move the same amount of air) as compared with the conventional design.

The use of larger fan blades, in addition to supplying more air to the fill structure, allows lower fan speeds which can reduce sound levels. Moreover, when using the same fan size as conventional designs, the underlying fill units can be moved inwardly to reduce the footprint of the tower.

Figure 13:
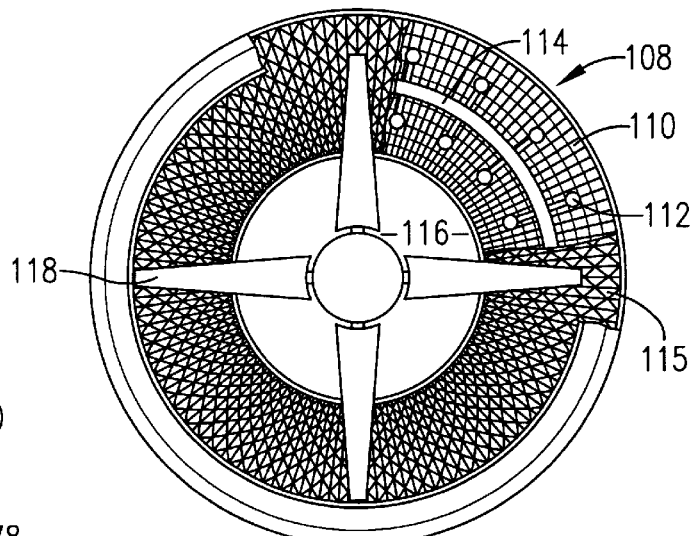
FIG. 13 is a schematic top view with parts broken away of an annular crossflow cooling tower in accordance with the invention, illustrating the draft-inducing fan disposed over the fill structure and with the upper level eliminator broken away to reveal the water distribution system and underlying fill structure.
Figure 10:
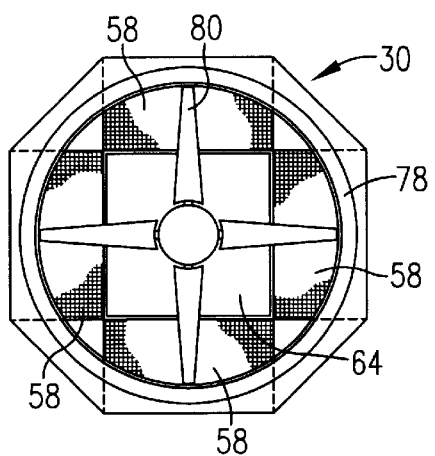
FIG. 10 is a schematic plan view of the tower illustrated in FIGS. 8–9.
Figure 11:
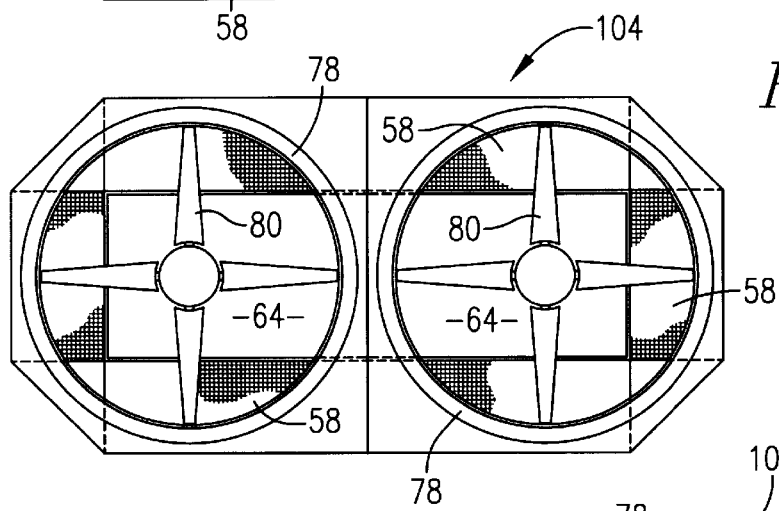
FIG. 11 is a schematic plan view of the double cell tower illustrated in FIG. 2.
Figure 12:
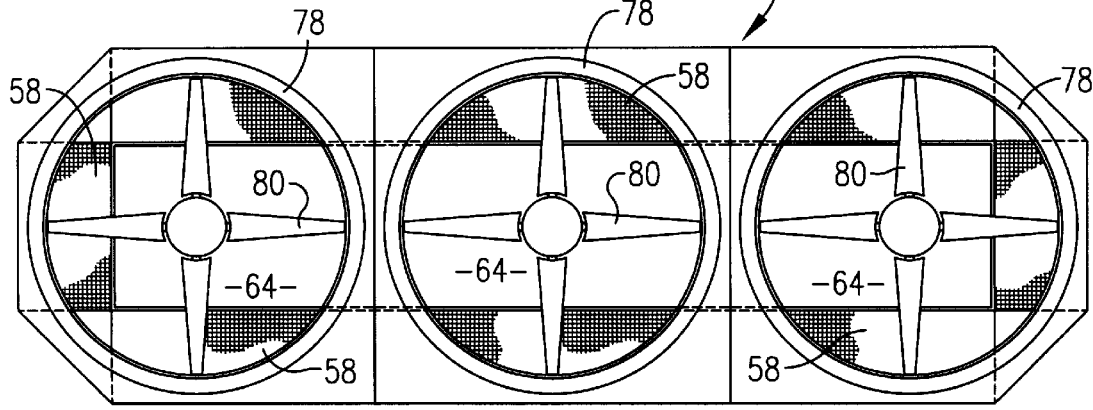
FIG. 12 is a schematic plan view of a triple cell tower of the type illustrated in FIGS. 10 and 11.

A variety of alternative components and designs can be used in the towers of the invention. Turning first to FIGS. 11 and 12, it will be seen that two and three cell towers 104, 106 can be constructed simply by placing the cells in side-by-side abutting relationship. In each cell, the fans 80 thereof partially overlie the respective horizontal drift eliminators 58 and the associated hot water distributors (not shown). Alternately as shown in FIG. 13, an annular tower 108 may be employed having an annular fill structure 110, and circumferentially spaced spray nozzle distributors 112 connected to a common annular delivery pipe 114, with an overlying annular drift eliminator 115. In this case, the plenum 116 is circular in horizontal cross-section, and the fan 118 overlies the plenum 116 as well as partially overlying the drift eliminator 115 and hot water distributors 112.

Attention is next directed to FIGS. 14–17 and 19–21 which illustrate towers similar to previously discussed tower 30 but with different component designs. In the ensuing discussion, attention will be directed to the features of the individual towers different from those of the tower 30; in all other respects, the towers are essentially identical with tower 30 and have identical reference numerals. Turning first to FIG. 14, the tower 120 is identical with tower 30 save for the provision of adjustable inlet louvers 122 positioned adjacent the upper portion of fill structure 32. These louvers are typically oriented for directing incoming air currents downwardly as shown, but may be adjusted as necessary to vary the air flow pattern. FIG. 15 depicts a tower 124 which is likewise identical with the tower 30, save for the use of splash-type fill bars 126 in lieu of the sheet-type fill described above. The bars 126 are supported by a conventional support framework 128 as shown and are disposed below the hot water distributors 34. FIG. 16 illustrates a tower 130 which differs from the tower 30 in that the upright eliminators 132 extend the full height of the respective fill units 40, and also upwardly therefrom into abutting contact with the lower surface of the horizontal fill 58. In this embodiment therefore, the eliminator 132 serves the function of the barrier walls 72 of tower 30, and also permit exit of air laterally and upwardly in the vertical region between the upper faces 48 and the associated horizontal eliminators 58.

FIG. 17 illustrates a tower 134 having water distributors in the form of a series of side-by-side weir-type pans 136 which are disposed above the faces 48 of the fill units 40. The pans 136 (see FIG. 18) include a bottom wall 138 as well as upstanding spaced apart sidewalls 140, 142. Each of these sidewalls has a series of spaced notches 144 for flow of water thereover during use of the pans, as shown by the arrows 146 of FIG. 17.

FIG. 19 depicts a tower 148 which differs from tower 30 by provision of an outboard mounted hot water delivery conduit 148 with a series of inwardly extending nozzle pipes 150 terminating in downwardly directed nozzles 152.

FIG. 20 shows a tower 154 wherein the hot water distributors are made up of one or more conduits 156, wherein each of the conduits has a plurality of upper outlet openings 158 formed therein. As shown in FIG. 20, water is delivered through the outlet openings for gravitation through the underlying fill units 40.

FIG. 21 depicts a tower 160 wherein the hot water distributors 34 are made up of a series of apertured, elongated conduits 162 which extend through formed openings in the fill sheets 42 making up the units 40. Thus, the conduits 162 not only serve as a means of distributing hot water to the fill structure, but also physically support the sheets 42 of the units 40.

FIGS. 23 and 24 illustrate towers 164, 166 each of which include a hyperbolic tower 168 for inducing ambient-derived cooling air currents. In each instance, the tower 168 includes a lower circular air inlet 169, a central plenum 170, and annular fill structure assembly 172 located adjacent the air inlet 169. The overall towers also include a primary cold water collection basin 173 disposed below the fill structure assembly 172 for collecting cooled water. As is evident from a study of these figures, the tower 164 includes a radially outwardly extending top wall 174 which is disposed over the fill structure assembly 172, whereas in tower 166 the fill structure assembly is disposed within the confines of the hyperbolic tower 168.

Turning now to the details of the assembly 172, it will be observed that the latter are essentially identical in cross-sectional configuration with the fill units 40 described above. Specifically, each assembly 172 includes a pair of annular offset fill units 176, 178 each having a plurality of hot water distributors 180, underlying film-type fill sheet packs 182, upright inlet louvers 184, upright outlet drift eliminators 186 and secondary, generally horizontal drift eliminators 188 above the hot water distributors 180. As shown, the fill unit 176 is in an elevated position and has a collection pan 190 supported on a drain support 192 leading to the primary basin 173. An oblique annular wall 194 extends between the bottom of pan 190 and the upper surface of fill unit 178, thereby preventing passage of incoming air between the offset fill units 176, 178.

The operation of the towers 164, 166 is identical with that of the other described towers, except that incoming cooling air currents are induced by the hyperbolic tower 168 instead of by a mechanical fan assembly. Thus, incoming cooling air currents enter the units 176, 178 through the louvers 184 and adjacent inlet face of the fill structures, and then exits the latter both through the opposed upright output face of the fill and also upwardly through the upper surface of the latter between the hot water distributors. The towers are also constructed so that a substantial fraction of the incoming air currents pass through the upright outlet and horizontal upper faces of the units 176, 178.

Figure 25:
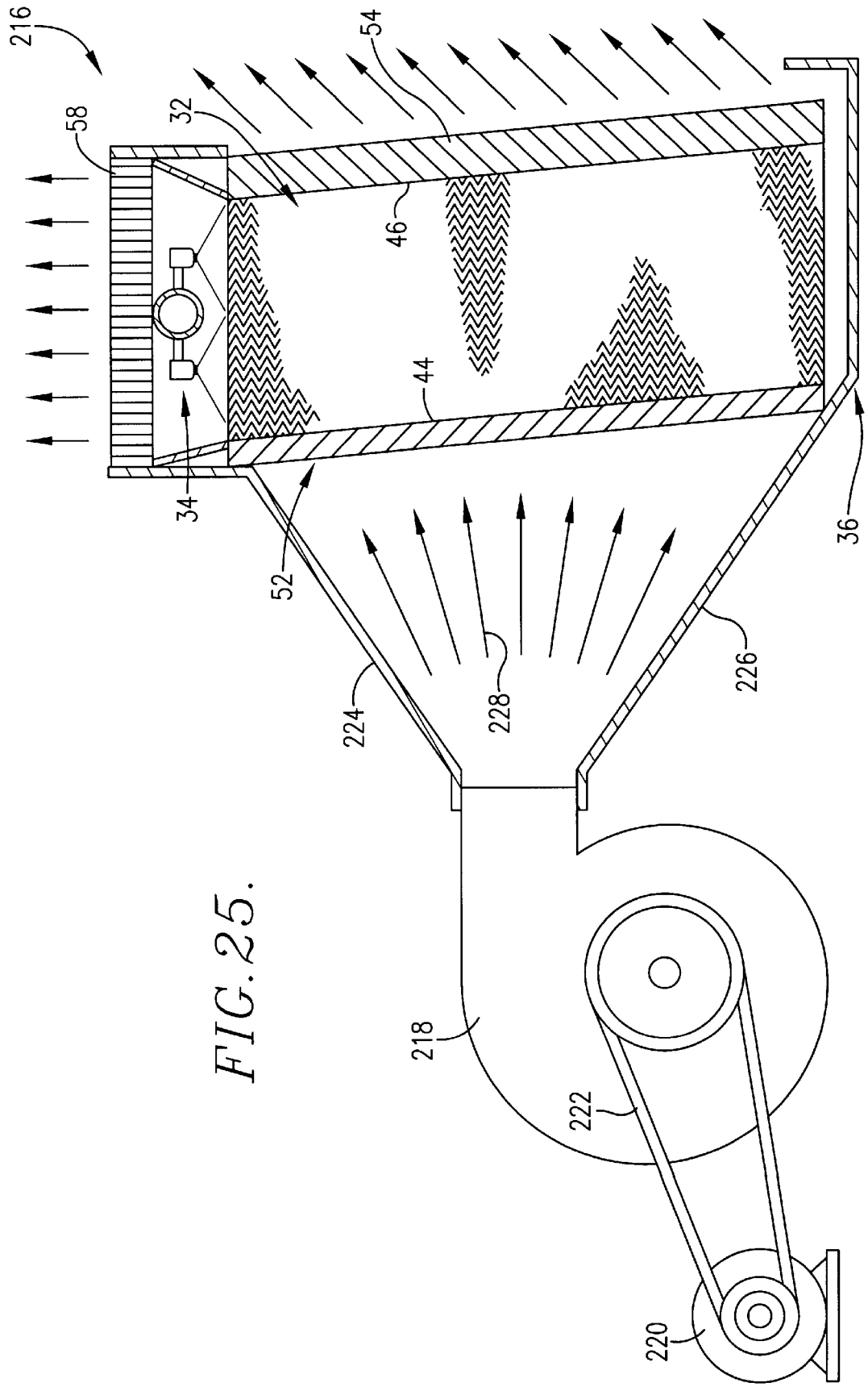
FIG. 25 is a fragmentary, essentially schematic partial vertical sectional view of a forced mechanical draft tower in accordance with the invention.

FIG. 25 depicts a forced mechanical draft tower 216 utilizing the principles of the invention. The tower 216 has film-type fill structure 32, hot water distributors 34, collection basin 36, louvers 52 and drift eliminators 54, 58 all arranged in the manner of tower 30. However, in this case, the air generator is in the form of a forced draft centrifugal fan 218 powered by a motor 220 through drive assembly 222. Walls 224, 226 extend from the output of fan 218 to the air inlet face 44 of the fill structure 32 so as to direct the positive pressure air currents 228 from blower 218 into and through the fill structure. It will be appreciated that the tower 216 operates in the same manner as the other towers described insofar as the air exit pattern from the fill structure is concerned.

The towers of the invention provide cooling capacities which cannot be duplicated with similarly sized conventional crossflow or counterflow towers. Considering first the comparative operational characteristics of prior art towers of the type illustrated in FIG. 3 versus the towers of the invention depicted in FIG. 5, it has been found that the latter towers can achieve in excess of a 30% increase in thermal capacity, i.e., the amount of water in gallons per minute which can be cooled.

Figure 22:
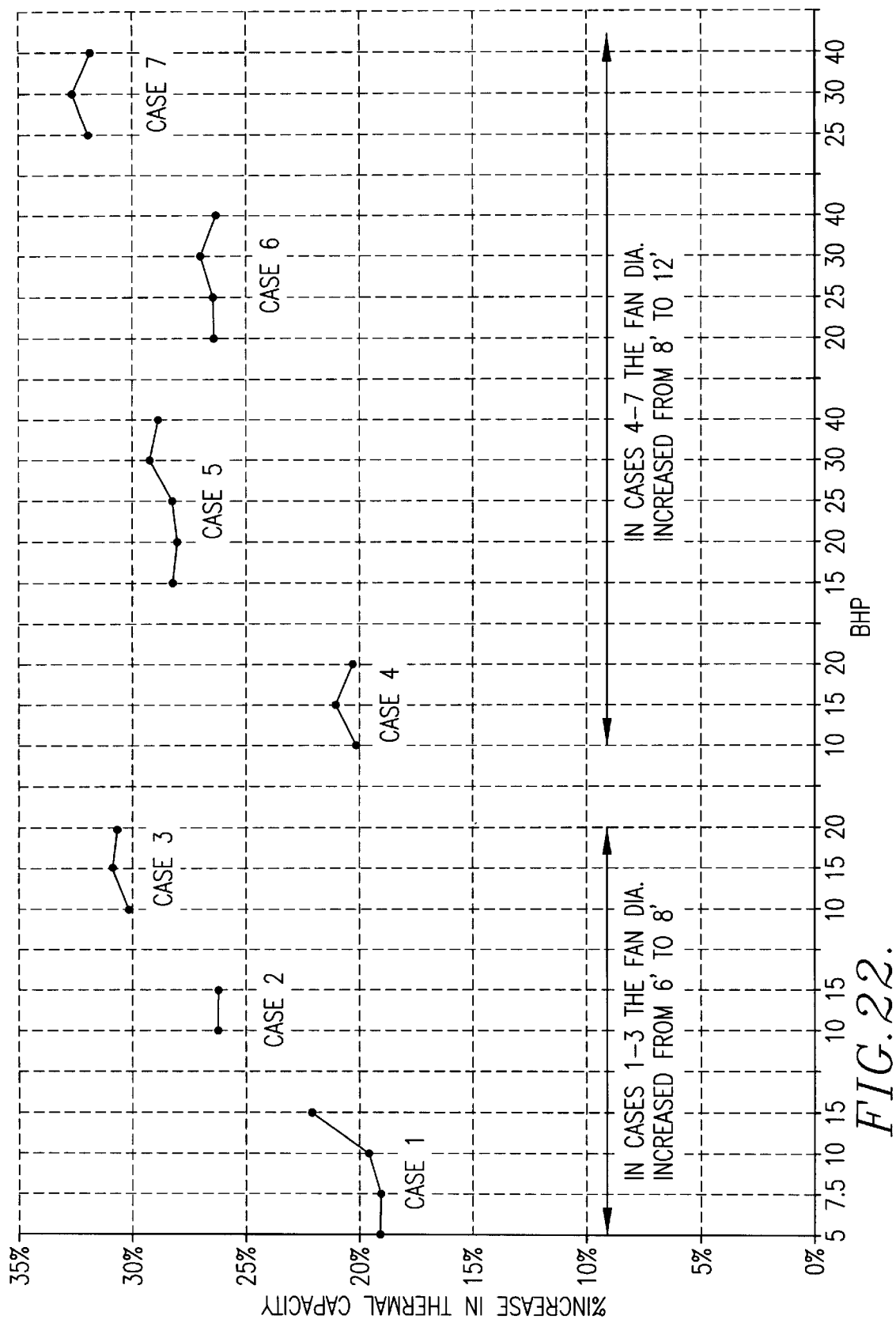
FIG. 22 is a graph illustrating increases in cooling capacity of towers of the invention, as compared with similar crossflow towers of conventional design.

Specifically, a study based on test results was undertaken comparing the conventional types of crossflow towers having six-foot and eight-foot diameter fan blades, versus towers of the invention otherwise of the same size but equipped with eight-foot and twelve-foot fan blades, respectively. In all cases the larger fan extended at least partially over the tower hot water distributors as illustrated in FIG. 5. In addition, fill height, length, and air travel were altered in the various cases in order to establish a range of potential improvements in thermal capacity. For example, case 1 differs from case 2 by increasing the fill height from 7.15' to 8.42'. The results of these tests are set forth in FIG. 22. In cases nos. 1–3, the comparison between six-foot and eight-foot fan blades was carried out using various sizes of fan motors and differing tower geometries. In case 1 for example, using a five horsepower motor the tower of the present invention with the eight-foot fan exhibited about a 19% increase in thermal capacity, as compared with the conventional tower. In the case of a fifteen horsepower motor the increase was approximately 22%. In case 3, using a fifteen horsepower motor gave approximately 31% improvement in thermal capacity. Cases 4–7 involved comparisons between eight-foot and twelve-foot fans case with the blades extending at least partially over the tower hot water distributors; again, various fan motor sizes were configured in conjunction with other tower parameters. As seen, in case 7 using a thirty horsepower fan motor, the increase in thermal capacity as compared with the conventional FIG. 5 tower was approximately 33%.

Figure 6:
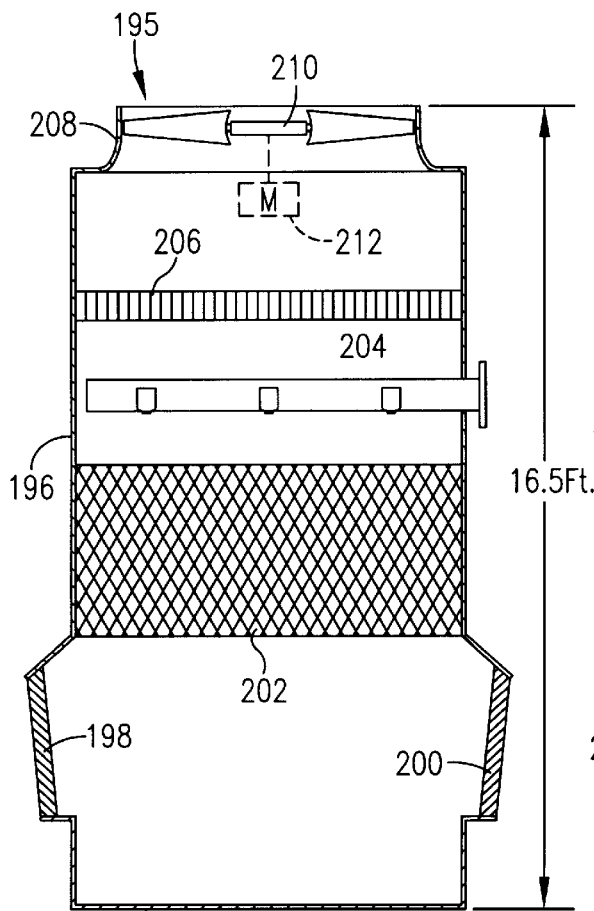
FIG. 6 is a schematic, vertical sectional view of a conventional prior art counterflow water cooling tower having a rated cooling capacity.
Figure 7:
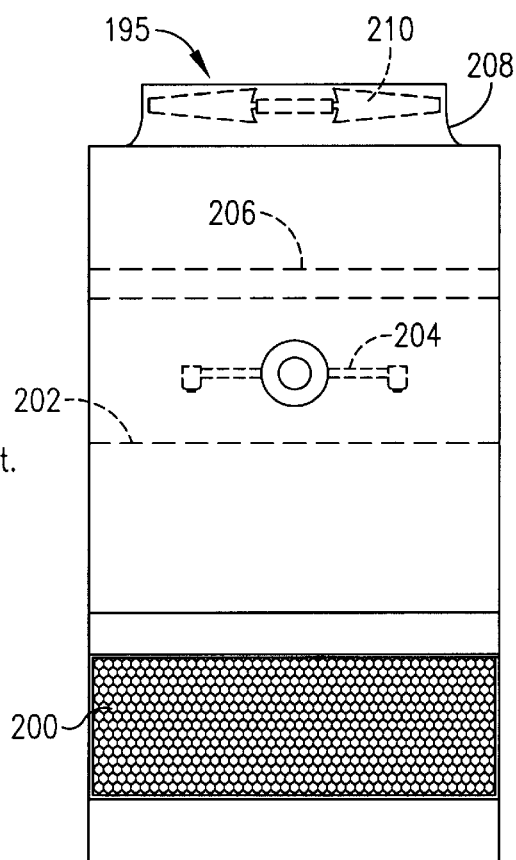
FIG. 7 is a schematic end elevational view of the counterflow tower depicted in FIG. 6.
Figure 8:
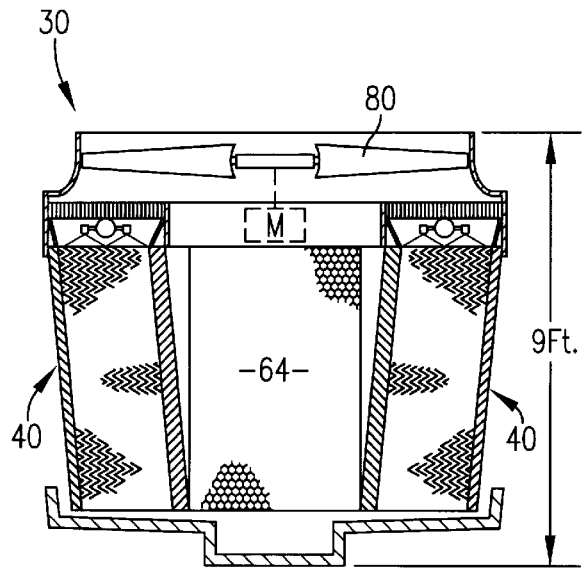
FIG. 8 is a schematic vertical sectional view of a mechanical draft crossflow cooling tower of the quad-flow variety in accordance with the invention, such tower having the same cooling capacity as the prior art counterflow tower of FIGS. 6 and 7.
Figure 9:
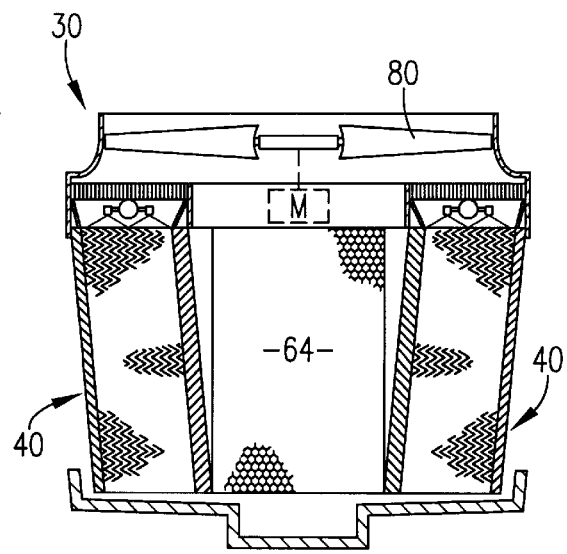
FIG. 9 is a view similar to that of FIG. 8, but illustrating the tower along a section line orthogonal to the section of FIG. 8.

The towers of the invention are also a significant improvement over conventional counter flow towers. Attention is directed to FIGS. 6–9, where FIGS. 6 and 7 are views of a conventional counterflow tower 195 made up of an upright casing 196 presenting a pair of side air inlet openings 198, 200 and having internal counter flow fill structure 202 above the openings 198, 200. In addition, a hot water distributor 204 is located above the fill structure 202, with a horizontal drift eliminator 206 disposed above the distributor 204. The casing 196 supports a fan stack 208 which houses a fan 210 powered by motor 212. The lower portion of the casing 196 is in the form of a cold water collection basin 214. The tower 195 is of a rated capacity and has a height of 16.5 feet. This is compared with a tower 30 in accordance with the present invention having the same rating capacity as the counterflow tower 195. The overall height of the tower 30 is only nine feet. This lessening of tower height is very significant in terms of overall tower cost, meaning that equivalent rated towers in accordance with the invention can be constructed at substantially less cost than prior counterflow towers.

Figure 4:
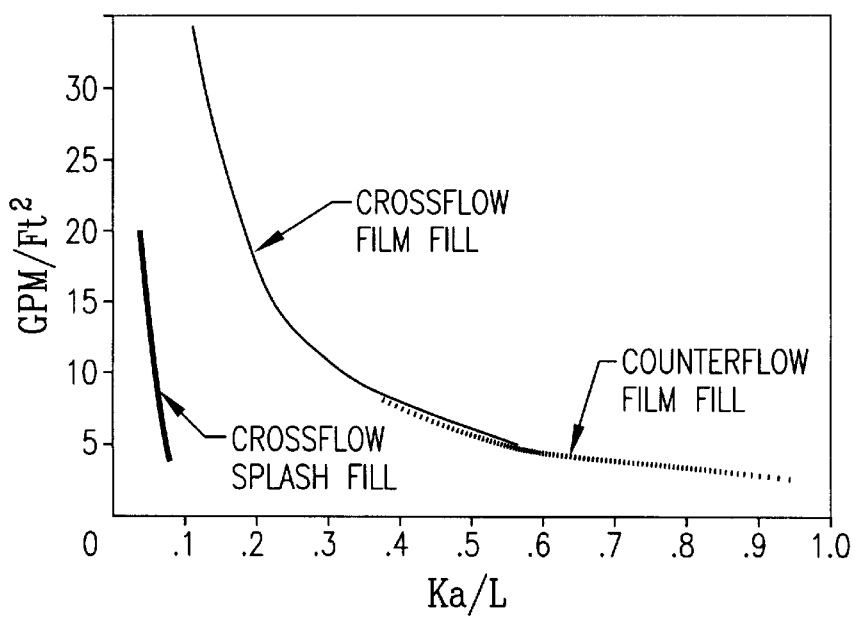
FIG. 4 is a graph illustrating the water cooling characteristics of conventional crossflow and counterflow cooling towers, using different types of fill structure.

The towers of the present invention are in no way similar to prior hybrid crossflow/counterflow towers. In order to better understand this fact, attention is directed to FIG. 4 which is a graph of average values of Ka/L (fill characteristic per unit volume) versus water loading at constant air velocity for crossflow splash fill, crossflow film fill, and counterflow film fill structures. K is the overall enthalpy transfer coefficient. "a" is area of transfer surface per unit volume. L is water flow rate. As shown in this graph, counterflow and crossflow film fills are approximately equal in performance at less than eight gallon/min per sq/ft (gpm/ft$^2$) fill plan area, but above this level the crossflow film fills performs better than the counterflow fills. It is this characteristic of crossflow versus counterflow fill structures which has prevented the widespread adoption of hybrid towers, i.e., at the high water loadings typical of crossflow towers, the counterflow fill performs poorly, but if low water loadings optimum for counterflow fills are used, then the crossflow fill structure operates inefficiently. In the case of the present invention, however, crossflow-type fill structure (and preferably crossflow film fill) is employed with high water loadings (typically from 10–35 gpm/ft$^2$, more preferably from about 15–25 gpm/ft$^2$), thereby avoiding the inherent disadvantages of hybrid towers.

The towers of the invention also have low noise ratings, which is an important environmental consideration. Low noise towers are desirable in virtually every application, but are particularly important in quiet environments such as hospitals and academic campuses. Accoustical engineers have developed a measurements of noise levels as heard by the human ear called the "A-Weighting Scale," measured in dBA units. Based upon theoretical calculations at constant horse power, towers of the invention are estimated to be on average about 5 dBA quieter in sound pressure level measured at 5 feet from the air inlet face or 5 feet from the fan discharge of the tower, as compared with conventional towers. Typical sound pressure levels for conventional unitary towers are in the range of about 80–90 dBA. Therefore, the towers of the invention should exhibit sound pressure levels of about 75–85 dBA (a 5 dBA change in sound pressure level lowers the sound pressure by 44%).

It is known that cooling tower noise levels can be reduced by slowing the fan speed and/or reducing the drawn horsepower. This noise reduction comes at the expense of thermal performance as the air rate through the tower is diminished. A 5 dBA reduction in conventional towers typically results in a cooling capacity loss of about 10–15%. With the present invention however, such reduced noise levels can be obtained without a reduction in cooling performance.

We claim:

1. A crossflow water cooling tower comprising:
   upright fill structure including a plurality of fill elements and presenting an upright air inlet face, an opposed upright air outlet face, an upper face extending transversely between the inlet and outlet faces, and an upper portion proximal to said upper face;
   a plurality of spaced apart hot water distributors oriented to deliver hot water to be cooled to said upper portion of the fill structure for gravitational flow therethrough;
   a cold water collection basin disposed below said fill structure in order to collect cold water gravitating from the fill structure; and
   a cooling air current generator operable to produce ambient-derived cooling air currents which enter said fill structure inlet face and exit the fill structure both laterally through said outlet face and upwardly through said upper face, with at least about 50% of the total air flow through the fill structure exiting the fill structure through said upright air outlet face, the spacing between said distributors permitting passage of air currents therebetween.

2. The crossflow cooling tower of claim 1, said generator comprising a fan disposed above said fill structure.

3. The crossflow cooling tower of claim 1, said generator comprising an upright, naturally draft-inducing hyperbolic tower.

4. The crossflow cooling tower of claim 1, said generator comprising a fan disposed adjacent said air inlet face of said fill structure for forcing said air currents therethrough.

5. The crossflow cooling tower of claim 1, including a first drift eliminator located adjacent the upright air outlet face of said fill structure.

6. The crossflow cooling tower of claim 1, including a second drift eliminator located above said hot water distributors.

7. The crossflow cooling tower of claim 1, said fill structure comprising a plurality of upright, laterally spaced apart, synthetic resin film sheets.

8. The crossflow cooling tower of claim 1, said fill structure comprising a plurality of splash fill bars.

9. The crossflow cooling tower of claim 1, said hot water distributors comprising a plurality of spaced apart water spray nozzles located above said fill structure.

10. The crossflow cooling tower of claim 1, said hot water distributors comprising at least one elongated water distribution pipe located above said fill structure, said pipe having a plurality of water delivery apertures therethrough.

11. The crossflow cooling tower of claim 1, said hot water distributors comprising a plurality of elongated weir distribution pans located above said fill structure and each presenting an upright sidewall sized to permit flow of water thereover.

12. The crossflow cooling tower of claim 1, said hot water distributors comprising at least one elongated, apertured water delivery pipe located adjacent said upper portion of the fill structure.

13. The crossflow cooling tower of claim 12, said fill structure comprising a plurality of upright, laterally spaced apart, synthetic resin film sheets, said delivery pipe extending through said film sheets for supporting the same.

14. The crossflow cooling tower of claim 1, including a first drift eliminator located adjacent the upright air outlet face of said fill structure, and a second drift eliminator located above said hot water distributors, said first drift eliminator extending substantially the full height of said fill structure and substantially abutting the underside of said second drift eliminator.

15. The crossflow cooling tower of claim 1, said fill structure comprising four individual fill structure units disposed about a central plenum, each of said fill structure units including a plurality of fill elements and presenting an upright air inlet face, an opposed upright air outlet face adjacent said plenum, an upper face extending transversely between the inlet and outlet faces, and an upper portion proximal to said upper face.

16. The crossflow cooling tower of claim 1, said fill structure comprising an annular array of fill elements defining a central plenum.

17. The crossflow cooling tower of claim 1, said fill structure comprising a pair of laterally offset fill structure units, each of said fill structure units including a plurality of fill elements and presenting an upright air inlet face, an opposed upright air outlet face adjacent said plenum, an upper face extending transversely between the inlet and outlet faces, and an upper portion proximal to said upper face.

18. The crossflow cooling tower of claim 1, at least about 70% of the total air flow through the fill structure exiting said upright air outlet face of the fill structure.

19. The crossflow cooling tower of claim 1, said fill structure defining a central plenum presenting a maximum transverse dimension, said cooling air current generator comprising a rotatable fan blade, said fan blade having a diameter greater than said maximum transverse dimension and in at least partial overlying relationship to said hot water distributors.

20. The crossflow cooling tower of claim 1, wherein the plan surface area of said fill structure presented by said upper face being less than about 50% of the surface area presented by said fill structure upright air outlet face.

21. A crossflow water cooling tower comprising:
   upright fill structure including a series of fill structure units cooperatively defining and being disposed about a central plenum, each of said fill structure units including a plurality of fill elements and presenting an upright air inlet face, an opposed upright air outlet face adjacent said plenum, an upper face extending transversely between the inlet and outlet faces, and an upper portion proximal to said upper face;
   a plurality of spaced apart hot water distributors oriented to deliver hot water to be cooled to said upper portions of the fill structure units for gravitational flow therethrough;

first drift eliminators located adjacent the upright air outlet faces of said fill structure units and extending substantially the full height thereof;

second drift eliminators located above said distributors;

a cold water collection basin disposed below said fill structure in order to collect cold water gravitating from the fill structure units; and a cooling air current generator operable to produce ambient-derived cooling air currents which enter the inlet faces of said fill structure units and exit the fill structure units both laterally through said outlet faces and upwardly through said upper faces, with at least about 50% of the total air flow through the fill structure exiting the fill structure units through said upright air outlet faces thereof, the spacing between said distributors permitting passage of air currents therebetween.

22. The crossflow cooling tower of claim 21, there being four of said fill structure units.

23. The crossflow cooling tower of claim 21, said generator comprising a fan disposed above said fill structure, and a circular stack disposed about said fan.

24. The crossflow cooling tower of claim 21, said generator comprising an upright, naturally draft-inducing hyperbolic tower.

25. The crossflow cooling tower of claim 21, said generator comprising a fan disposed adjacent said air inlet face of said fill structure for forcing said air currents therethrough.

26. The crossflow cooling tower of claim 21, each of said fill structure units comprising a plurality of upright, laterally spaced apart, synthetic resin film sheets.

27. The crossbow cooling tower of claim 21, each of said fill structure units comprising a plurality of splash fill bars.

28. The crossflow cooling tower of claim 21, said hot water distributors comprising a plurality of spaced apart water spray nozzles located above said fill structure.

29. The crossflow cooling tower of claim 21, said hot water distributors comprising at least one elongated water distribution pipe located above said fill structure, said pipe having a plurality of water delivery apertures therethrough.

30. The crossflow cooling tower of claim 21, said hot water distributors comprising a plurality of elongated weir distribution pans located above said fill structure and each presenting an upright sidewall sized to permit flow of water thereover.

31. The crossflow cooling tower of claim 21, said hot water distributors comprising at least one elongated, apertured water delivery pipe located adjacent said upper portion of the fill structure units.

32. The crossflow cooling tower of claim 31, each of said fill structure units comprising a plurality of upright, laterally spaced apart, synthetic resin film sheets, there being a delivery pipe extending through said film sheets for supporting the same.

33. The crossflow cooling tower of claim 21, said first drift eliminator extending substantially the full height of said fill structure and substantially abutting the underside of said second drift eliminator.

34. The crossflow cooling tower of claim 21, said fill structure units being laterally offset from each other.

35. The crossflow cooling tower of claim 21, at least about 70% of the total air flow through the fill structure exiting said upright air outlet faces of the fill structure units.

36. The crossflow cooling tower of claim 21, said plenum presenting a maximum transverse dimension, said cooling air current generator comprising a rotatable fan, said fan having a diameter greater than said maximum transverse dimension and in at least partial overlying relationship to said hot water distributors.

37. A method of cooling initially hot water comprising the steps of:

delivering said hot water to the upper portion of upright fill structure for gravitational flow therethrough, said fill structure including a plurality of fill elements and presenting an upright air inlet face, an opposed upright air outlet face, and upper face extending transversely between the inlet and outlet faces, and said upper portion proximal to the upper face; and producing ambient-derived cooling air currents which enter said fill structure inlet face and exit the fill structure both laterally through said outlet face and upwardly through said upper face, with at least about 50% of the total air flow through the fill structure exiting the fill structure through said upright air outlet face, the spacing between said distributors permitting passage of air currents therebetween.

38. The method of claim 37, including the step of passing the exiting air currents through respective eliminators located proximal said upright air outlet face and said upper face.

39. The method of claim 37, including the step of delivering said hot water to be cooled at a point above said upper face.

40. The method of claim 37, including the step of delivering said hot water to be cooled at a point within said upper portion of the fill structure.

41. The method of claim 37, including the step of producing said cooling air currents by operating a fan located above said fill structure.

42. The method of claim 37, including the step of producing said cooling air currents through the medium of a natural draft hyperbolic tower.

43. The method of claim 37, including the step of producing said cooling air currents by operating a fan located proximal to the air inlet face of said fill structure.

44. A crossflow water cooling tower comprising:

upright fill structure including a plurality of fill elements and presenting an upright air inlet face, an opposed upright air outlet face, an upper face extending transversely between the inlet and outlet faces, and an upper portion proximal to said upper face, said fill structure cooperatively defining and being disposed about a central plenum;

a plurality of spaced apart hot water distributors oriented to deliver hot water to be cooled to said upper portion of the fill structure for gravitational flow therethrough;

a cold water collection basin disposed below said fill structure in order to collect cold water gravitating from the fill structure; and a fan assembly including a rotatable fan operable to induce ambient-derived cooling air currents which enter said fill structure inlet face and exit the fill structure both laterally through said outlet face and upwardly through said upper face, said fan having a diameter greater than said maximum transverse dimension of said plenum and in at least partial overlying relationship to said hot water distributors.

45. The crossflow cooling tower of claim 44, at least about 50% of the total air flow through the fill structure exiting the fill structure through said upright air outlet face, the spacing between said distributors permitting passage of air currents therebetween.

46. The crossflow cooling tower of claim 45, said fan diameter being at least about 10% greater than said maximum transverse dimension of said plenum.

* * * * *